Aug. 4, 1942.  E. J. DILLMAN  2,292,214
CONTROL DEVICE
Filed May 22, 1939  3 Sheets-Sheet 2
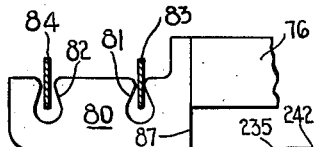
FIG-6
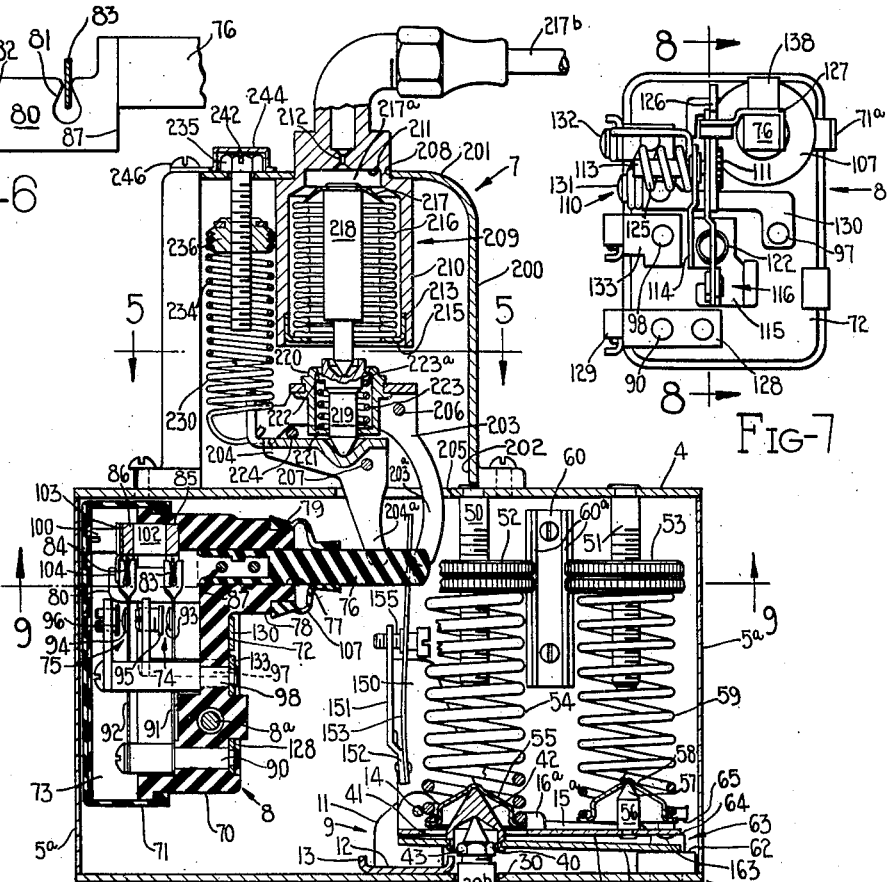
FIG-4
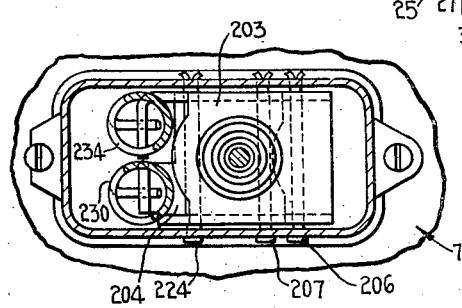
FIG-5
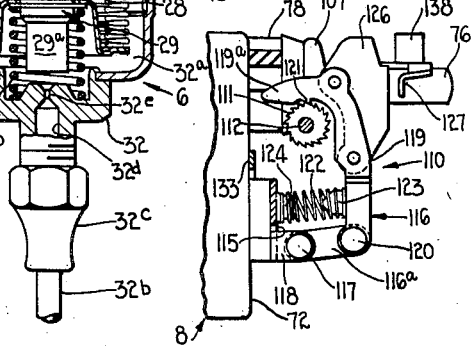
FIG-7
FIG-8
INVENTOR
Earnest J. Dillman
BY
Andrew K. Foulds
his ATTORNEY

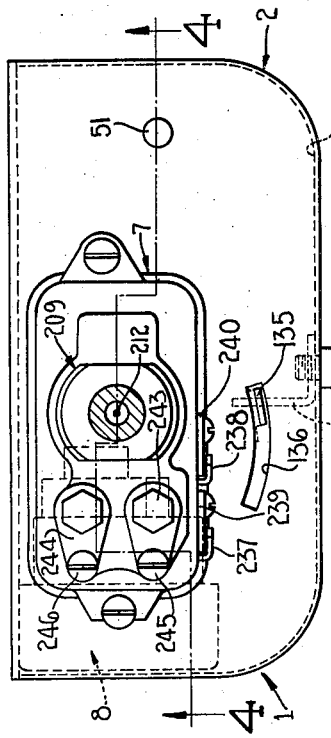

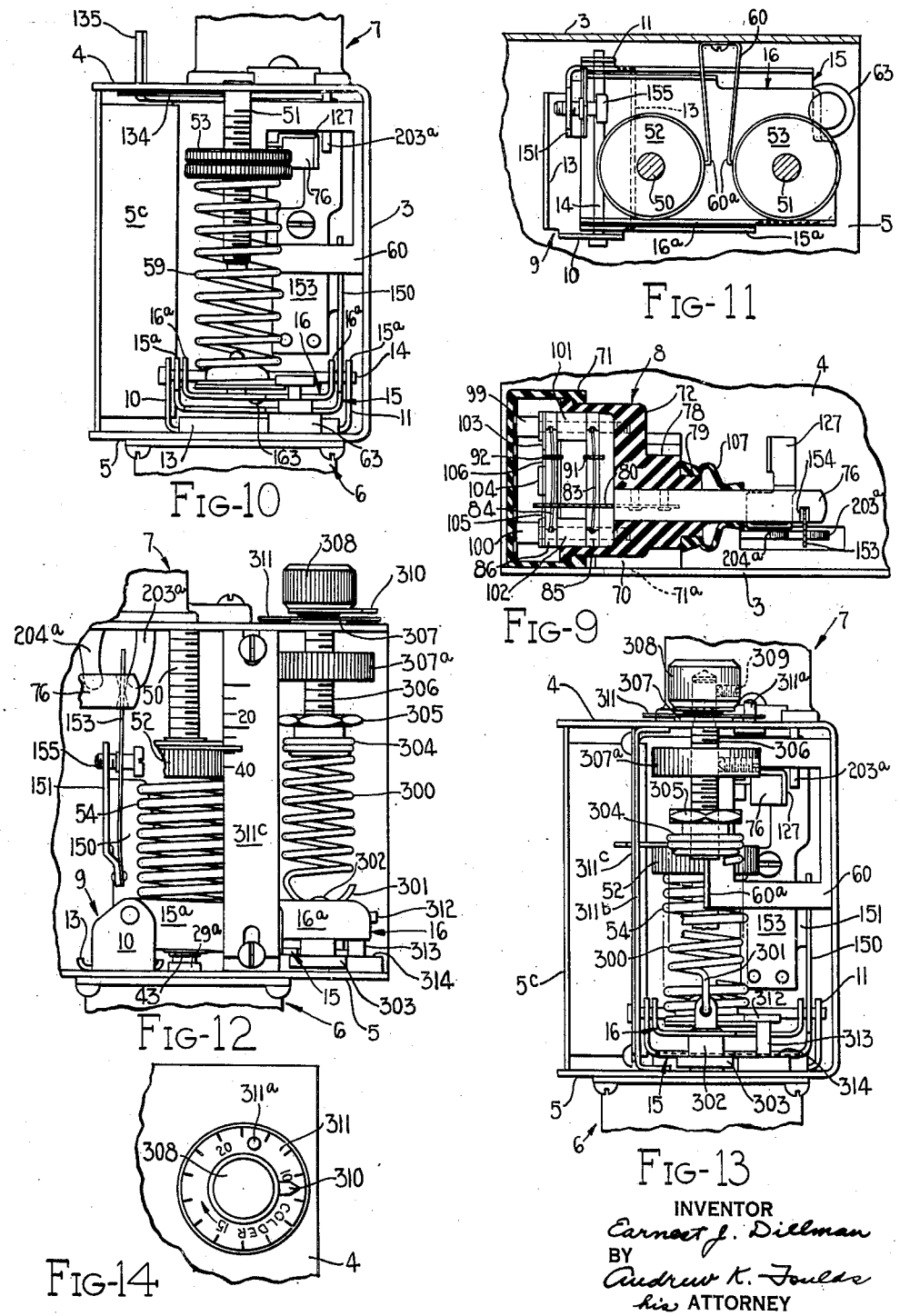

Patented Aug. 4, 1942

2,292,214

BEST AVAILABLE COPY

UNITED STATES PATENT OFFICE 2,292,214

CONTROL DEVICE

Earnest J. Dillman, Detroit, Mich., assignor to Detroit Lubricator Company, Detroit, Mich., a corporation of Michigan Application May 22, 1939, Serial No. 274,894

32 Claims. (Cl. 200—83)

My invention relates generally to new and useful improvements in control devices and more particularly to those operating in accordance with pressure or temperature.

An object of my invention is to provide an apparatus operable to control a means in response to pressure or temperature.

Another object of my invention is to provide an apparatus which may readily be adjusted to maintain a different range of pressure limits without changing the differential of pressure maintained.

Another object of my invention is to provide an apparatus which may readily be adjusted to maintain a different differential of pressure without changing one of the predetermined limits.

Another object of my invention is to provide means normally inactive but operable upon a predetermined abnormal change in pressure beyond one of the predetermined limits to indicate the abnormal condition.

Another object of my invention is to provide an apparatus for controlling the operation of a refrigerating system to maintain the cooling coil pressure between predetermined pressure limits.

Another object of my invention is to provide a refrigeration control which is easily adjusted to maintain various temperatures in the refrigerated compartment, and maintain a predetermined constant cut-in point to insure complete defrosting of the cooling coil each cycle of operation.

Another object of my invention is to provide an apparatus which normally acts to operate a refrigerating system according to a condition of the cooling coil but which is also operable to maintain the high side pressure between predetermined limits.

Another object of my invention is to provide an apparatus by which either of the predetermined high side limits may be adjusted without change of the other limit.

Another object of my invention is to provide a new and novel pressure or temperature operated switch simple in operation, installation and manufacture.

Another object of my invention is to provide a new and novel apparatus in which the various cooperating elements may be easily removed as units for repair or replacement.

The invention consists in the improved construction and combination of parts, to be more fully described hereinafter and the novelty of which will be particularly pointed out and distinctly claimed.

In the accompanying drawings, to be taken as a part of this specification, I have fully and clearly illustrated a preferred embodiment of my invention, in which drawings—

Figure 1 is a view in front elevation of my control apparatus with the cover and cover attaching post removed;

Fig. 2 is a side view of certain pressure operating mechanism taken substantially along the line 2—2 of Fig. 1, but with its front casing wall broken back to show more clearly the indicating means, and with the locking members removed;

Fig. 3 is a top plan view of the apparatus shown in Fig. 1 but with the pressure fitting in section and the cover and its post in place;

Fig. 4 is a view along the line 4—4 of Fig. 3 and taken in the direction of the arrows;

Fig. 5 is a view along the line 5—5 of Fig. 4 and taken in the direction of the arrows;

Fig. 6 is an enlarged detailed view of a portion of the switch mechanism, showing the cooperative relation of the plunger member and the snap springs;

Fig. 7 is a view in side or end elevation of the switch mechanism casing showing certain overload cut-out means;

Fig. 8 is a view taken along the line 8—8 of Fig. 7 in the direction of the arrows;

Fig. 9 is a view substantially along the line 9—9 of Fig. 4 showing a portion of the switch structure;

Fig. 10 is a view in end elevation of a portion of the apparatus shown in Fig. 1 and showing the arrangement of levers and springs;

Fig. 11 is a view with the top main casing wall removed and showing a portion of the apparatus shown in Fig. 10;

Fig. 12 is a view in front elevation of a modified form of lever and spring arrangement;

Fig. 13 is a view in end elevation of the modification of the apparatus of Fig. 12;

Fig. 14 is a top plan view of an external manual adjusting means shown in Fig. 12, and Fig. 15 is a plan view of the resetting lever showing its cooperation with the plunger member.

Referring to the drawings by characters of reference the numeral 1 designates generally my control apparatus having a substantially U-shaped sheet metal member 2 having a vertical connecting or rear wall 3 and parallel, horizontally extending, upper and lower walls 4, 5, respectively. A U-shaped member 5ª cooperates with the member 2 to form an enclosed casing, and is held in place by means of a thumb screw 5ᵇ threaded into a cover attaching post 5ᶜ, preferably an angle member having its front flange secured at its top and bottom ends to the walls 4, 5. A low pressure power element 6 is secured to the outside of the wall 5 and a high pressure power element 7 is secured to the outside of the wall 4. A switch mechanism or unit 8 is secured within the casing to the vertical wall 3, as by a screw 8ª. Secured to the inside of the wall 5 is a fulcrum or bracket member 9 having upturned ears 10, 11 and a horizontally disposed base portion 12 reenforced by having upwardly bent edge portions 13. The ears 10, 11 have aligned apertures which receive a shaft or rod member 14 extending parallel to the wall 5 and normal to the wall 3, and on which are journaled lever members 15, 16. The lever members 15, 16 are plate-like with upturned reenforcing side portions 15ª, 16ª in which are aligned apertures for receiving the shaft 14. The lever member 16 overlies the lever member 15 and the members extend substantially parallel to wall 5 and overlie the power element 6.

The power element 6 comprises a cup-shaped casing member 20 having at its open end an outturned flange 21 having apertures through which the screws extend to secure the cup-shaped member rigidly to the wall 5. Within the casing 20 and located adjacent its open upper end is an annular member 22 having a flange portion 23 sealed in fluid-tight relation to the casing 20. A bellows 24 has one end rigidly secured to the annular member 22 and extends therefrom toward the bottom end wall 25 of the casing member 20, where it is sealed, as at 26, to the flange portion of a cup-shaped member 27. The member 27 extends within the bellows 24 and has an aperture through its bottom wall 28 in which is sealed a thrust member 29 having one end portion 29ª extending toward the end wall 25 and the other end portion 29ᵇ extending through an aperture 30 in the wall 5 and terminating adjacent the lever member 15. A nut-like member 32 is secured in fluid-tight relation in an aperture 31 through the wall 25 and cooperates with the end portion 29ª of the thrust rod 29 to limit expansive movement of the bellows 24. The nut-like member 32, casing 20, annular member 22, bellows 24, cup-shaped member 27 and thrust member 29 cooperate to form a sealed, pressure responsive, expansible-contractible chamber 32ª. A conduit 32ᵇ communicating with a source of pressure, which may be the suction line of a refrigerating system, is secured by means of a nut 32ᶜ to the member 32, and the fluid pressure is transmitted to the chamber 32ª through a passageway 32ᵈ communicatively connecting the conduit 32ᵇ with the chamber 32ª. The passageway 32ᵈ has a restricted throat portion 32ᵉ which acts to prevent any rapid fluctuation of pressure, which might occur in the conduit 32ᵇ, from being readily communicated to the chamber 32ª.

Concentric with the thrust member 29 and interposed between the cup-shaped member 27 and the nut-like member 32 is a helical coil spring 33 which tends to collapse the bellows 24 and acts to supplement the force of the fluid pressure within chamber 32ª. The lever members 15, 16 have apertures 40, 41 respectively, concentric with the thrust member 29. A hollow, cone-shaped force transmitting member or abutment 42 is mechanically secured to the lever member 15 within the aperture 40 and extends upward through the aperture 41 in the lever member 15 but is spaced from the member 16 so that the lever member 15 is free to move without movement of the member 16. Screw-threaded in the end portion 29ᵇ of the thrust member 29 is a cone-shaped abutment member 43 having its pointed portion or apex received within an internal apex portion of the hollow, cone-shaped member 42.

A screw-threaded, bolt-like member 50 is fixed against rotation and secured within an aperture in the wall 4 of the casing 2, as by peening, and extends downward toward the wall 5 concentric with the thrust rod 29. A second bolt-like member 51 is secured against rotation in like manner to the wall 4 and extends downward toward the lever member 16 intermediate the aperture 41 and the end portion of the lever farthest away from the fulcrum member 9. Screw-threaded on the bolt-like members 50, 51 are threaded adjustment nuts or abutment members 52, 53 respectively. A helical coil spring 54 is held under compression between the abutment member 52 and a spring abutment member 55 having a recessed portion with an internal, cone-shaped base which receives the apex of the cone-shaped member 42 so that the force of the spring 54 may be transmitted through the cone-shaped member 42 to the thrust member 29 of power element 6 to oppose upward or counter-clockwise movement of lever member 15 and the collapsing movement of bellows 24 due to the spring 33 and the fluid pressure within chamber 32ª. A thrust member or spring supporting post 56 is secured to the lever member 16 concentric with the bolt-like member 51, and extends upward from the lever member 16 toward the bolt-like member 51, terminating in a needle-like point 57 which is received within an indented portion of a spring abutment member 58. Interposed between the abutment member 58 and the adjustment member 53 is a helical coil compression spring 59 which urges the lever member 16 in a clockwise direction. The spring 54 is the range adjusting spring and the spring 59 is the differential adjusting spring. The peripheral surfaces of the adjustment nuts 52, 53 are knurled and cooperate with the outturned end portions of a U-shaped spring or unitary locking member 60 secured to the vertical connecting wall 3 as by means of screws. The member 60 has its arms or sides terminating in vertically extending, outturned edges 60ª which frictionally engage the knurled portion of the adjustment nuts 52, 53 so that they may be readily rotated by hand, but are held to prevent unwanted rotation during operation of the instrument. The lever member 15 is limited in its clockwise rotation by an upward facing shoulder 62 of a stop member 63 secured to the wall 5. Clockwise movement of lever member 16 is limited by means of an upward facing shoulder 64 on the member 63 and spaced from the shoulder 62 and so arranged that the lever members 15, 16, when against their respective stop shoulders, are held in spaced relation. Counterclockwise movement of the lever members 15, 16 is limited by engagement of lever member 16 with a downward facing shoulder 65 on the stop member 63.

The switch mechanism 8 comprises a hollow, open sided casing or housing member 70 preferably made of molded, electric insulating material, such as Bakelite, having its vertical open side facing away from the lever members 15, 16 and closed by a hollow cover member 71 which may be made of pliable material, such as rubber, having the marginal edge of its side wall held to and overlapping the marginal edge of the side wall of the casing 70 in a stressed condition. A projection 71ª on the rear face of the casing 70 is received and fits within an aperture through the wall 3 of the member 2 to facilitate the locating of the mechanism 8 during the assembly of the apparatus 1, or in the event of replacement, and to cooperate with the screw 8ª to hold the casing 70 in position. Secured to the wall 72 of the casing 70 and within a chamber 73 formed by the wall 72 and cover member 71 is a pair of switch means 74, 75 operated by a common plunger member 76 of electric insulating material extending parallel to the wall 3 which reciprocates in and is carried within an aperture 77 through the wall 72. The plunger member 76 is rectangular in cross-section to fit the rectangular aperture 77 so that the plunger member is held against rotation. Surrounding the wall aperture 77 and integral with the wall 72 is a portion 78 extending outwardly and which has an annular, outward facing shoulder providing a cylindrical cap member receiving portion 79. The portion 78 also provides an elongated bearing surface for the plunger member 76 so that there will be less danger of cocking and consequent sticking of the member 76 in its reciprocation. The plunger member 76 has at its inner end, within the casing 70, a vertically and longitudinally extending blade portion 80 having two upward opening, longitudinally spaced, pear-shaped apertures 81, 82 which receive, respectively, transversely extending snap springs 83, 84 which are thin, highly flexible and resilient blades. The horizontally extending snap springs 83, 84 have their end portions held in opposed, V-shaped vertical grooves in the spaced, downward extending arms of inverted, U-shaped members 85, 86 respectively, which hold the springs in a bowed or stressed position. The restricted portion of the aperture 81 is narrower than the restricted portion of the aperture 82, and preferably substantially fits the spring 83. Movement of the plunger member 76 inwardly into the casing 70 will cause the springs 83, 84 to flex with a snap action and bow toward the cover member 71. The narrow restricted portion of the aperture 81 will engage and flex the spring 83 to its outwardly bowed position, away from the wall 72, and upon continued movement of the plunger member 76 the restricted portion of aperture 82 will engage and flex the spring 84 to its outwardly bowed position. Upon reverse movement of the plunger member 76 the spring 84 will be engaged and flexed to inwardly bowed position, bowing toward the wall 72. Under normal movement of the member 76 the width of the restricted portion of aperture 82 is sufficient so that the spring 84 remains bowed toward the wall 72. Movement of the plunger member 76 toward the right after springs 83, 84 are bowed toward wall 72 is limited by a shoulder 87 on the blade portion 80 which engages the wall 72 thereby limiting this bowing of the springs.

A post member 90 is molded into and projects from the casing wall 72 and has secured thereto in horizontally spaced relation, a pair of vertically extending, overlying switch blade members 91, 92 which extend upward from post member 90. Adjacent their upper ends, the blade members 91, 92 are twisted through 90° and each has in its upper end, an end slot through which the snap springs 83, 84 respectively extend and fit. The blade members 91, 92 carry contact members 93, 94 which cooperate respectively with stationary contact members 95, 96 carried by posts 97, 98 molded in and projecting from the casing wall 72. The blade members 91, 92 are stressed toward the fixed contact members 95, 96 respectively so that they act with the springs 83, 84 to move the contact members into and to hold the contact members in engagement. Movement of the plunger member 76 into the casing 70 causes the snap spring 83 to snap so that it is bowed outward or toward the cover member 71 causing the contact member 93 to move into switch closed position with the contact member 95. Continued movement of the plunger member 76 toward the cover 71 causes snap spring 84 to snap so that it is bowed outward or toward the cover member 71 thereby causing contact member 94 to move into cooperative relation with the contact member 96. The U-shaped members 85, 86 are held rigidly to the casing wall 72 and within the chamber 73 by screws 99, 100 and are held in spaced relation relative to each other by tubular members 101, 102 on the screws 99, 100 respectively. A plate-like member 103 is held at its ends to the U-shaped member 86 by the heads of the screws 99, 100 and has a downward, offset portion 104 acting as a stop to limit bowing movement of the snap spring 84 under inward movement of the plunger member 76 so that the springs 83, 84 will not be dislodged from the U-shaped members 85, 86. Downwardly open apertures 105, 106 in the underside of member 103, intermediate the offset portion 104 and the portions of the member 103 adjacent the heads of the screws 99, 100, serve to receive and permit free movement of the blade portion 80 and the apertured or upper end of the switch blade member 92. A rubber cap or sealing member 107 has one portion fitting tightly around and held stressed to the plunger member 76 and another portion fitting tightly around the casing portion 78 and held stressed to the shoulder 79 so that it serves to seal the aperture 77 to prevent flow of fluid with moisture or dust into the chamber 73. The member 107 has intermediate its ends an outturned, circumferential bellows-like fold which permits easy reciprocation of the plunger member 76 without any substantial stress on the cap member.

An overload device, generally designated 110, is carried on and secured to the outer surface of the wall 72. The overload device 110 is of the well known, solder pot type of construction, having a ratchet wheel 111 carried on an axle 112 which is received within a tubular member 113. A low temperature melting solder normally prevents rotation of the axle 112 in the tubular member 113. The tubular member 113 is rigidly held by a plate-like member 114 which has a portion 115 secured to the wall 72. A jointed or articulated, pivoted lever member 116 has a substantially horizontally extending portion 116ª pivoted, as at 117, to an upturned horizontal ear 118 of the portion 115. An L-shaped portion 119 is pivoted to the vertical portion 116ª, as at 120, and has a tooth 121 which engages in the ratchet wheel 111 to prevent the lever 116 from being moved outward from wall 72, due to the force of a helical coil compression spring 122, under compression intermediate the portion 115 and the vertical part of the L-shaped portion 119. The spring 122 is positioned by lugs 123, 124 secured respectively to the portions 119, 115. A heater coil 125, electrically insulated from the tubular member 113, is adapted to be in series circuit with the contact members 93, 95. The heater coil 125 is so proportioned relative to the normal load to be controlled by the contact members 93, 95 that it does not generate sufficient heat to melt the solder which holds the axle 112 rigid with the conduit member 113, but upon a predetermined increased load the heater coil will give off sufficient heat to melt the solder and release the ratchet wheel. Release of the ratchet wheel 111 allows a plate-like member 126 secured to the L-shaped portion 119 to engage a bracket arm 127 secured to the plunger member 76. On the end of lever portion 119 there is a horizontal toe 119a which rests on the wheel upon disengagement of tooth 121 so that the tooth may be readily reengaged. The spring 122 should be of sufficient strength so that upon engagement of the plate member 126 and the bracket arm 127 it will act to move the plunger member 76 outward to open the circuit through contact members 93, 95 irrespective of any closing force exerted on the plunger member 76. This will also cause the circuit controlled by the contact members 94, 96 to be opened.

The contact members 93, 94 are electrically connected by means of the blades 91, 92 respectively to the supporting post 90, and therethrough to a bus bar or conductor strip 128 having a binding post connection 129 for receiving a connecting wire from a source of electrical energy supply. The contact member 95 is connected by means of post 97 to a bus bar or conductor strip 130 which has a binding post 131 for receiving one end of the heater coil 125. The other end of the coil 125 is attached to a binding post member 132 secured to the casing 70 and which is adapted to receive a wire leading to the apparatus to be controlled by the switch means 74. The contact member 96 is connected through post 98 and a bus bar or conductor strip 133 to a binding screw which is adapted to receive a wire leading to the alarm circuit controlled by the switch means 75.

A resetting mechanism (Figs. 1, 3 and 15) is carried by the top wall 4 for manually reengaging the tooth 121 and the ratchet wheel 111 subsequent to cooling of the solder holding the axle 112 to the tubular member 113. The resetting mechanism comprises a lever member 134 pivoted, as at 134a, to the wall 4 and having an upturned portion 135 extending through an arc-shaped aperture 136 in the casing wall 4 for manual operation external of the casing. The lever member 134 has a downwardly projecting ear portion 137 which is adapted upon pivotal movement of the lever member 134 to engage the plate member 126 to move the articulated lever member 116 in a counterclockwise direction so that the tooth 121 again engages the ratchet wheel 111. The lever member 134 also has a cam edge portion 137a which engages a post member 138 carried by the plunger member 76 so that upon resetting movement of the lever member 134 the switch means 74, 75 are maintained in open circuit position regardless of the fluid pressure in chamber 32a. With this construction it is impossible to hold the resetting mechanism lever 134 in resetting position and maintain either of the switch means 74, 75 in circuit closed position so that the overload is thereby rendered ineffective to protect the overloaded circuit.

The lever member 15 is connected to the plunger member 76 through a vertical projecting or upstanding arm 150 having a portion or flange 151 extending substantially normal to the plane of the vertical wall 3. Secured to the lower end part 152 of the portion 151, in a manner such as by riveting, is one end of a flexible blade 153 which extends upward from the part 152 and inclines toward the flange 151 by reason of the inclination of the part 152. The upper end portion of the blade 153 has its side edge received within a converging-diverging slot or aperture 154 in the plunger member 76 so that pivotal movement of the lever member 15 will move the plunger member causing the switch blades 91, 92 to make or break their respective circuits. The blade 153 is preferably relatively stiff and so proportioned relative to the resistance of the snap springs 83, 84 that movement of the plunger member 76 by the lever member 15 will cause no bending or springing of the blade 153. Screw-threaded into the upper end of the portion 151 and extending through an aperture in the blade 153 is an adjustment member or screw 155 having a flange against which the blade 153 bears and is held by its inherent resilience. The member 155 moves or flexes the blade 153 relative to the portion 151 so that the position of the lever member 15 relative to the position of the plunger member 76 at which the contacts 93, 95 and 94, 96 are closed or opened, may be adjusted. The blade 153, due to its ability to be flexed, allows movement of the plunger member 76 relative to the lever member 15 for movement of the plunger member to open circuit position when the power element 6 calls for closed circuit position of the switch means 74, 75, and for other purposes to be hereinafter described.

Fluid pressure is introduced to the power element 6 by means of the conduit 32b, and increase in fluid pressure within the chamber 32a causes the thrust member 29 to move inward toward the wall 4 and rotate the lever member 15 in a counterclockwise direction. Upon predetermined movement of the lever 15 it engages a downwardly projecting lug 163 of the lever member 16 so that continued rotation of the lever member 15 will cause corresponding rotation of the lever member 16. It may be seen that the helical coil spring 54 opposes initial movement of the thrust member 29, but after predetermined movement of the lever 15 to cause engagement with the lug 163 of the lever member 16, further movement of the thrust member 29 is opposed by the sum of the forces of the springs 54, 59. The relative position of the plunger member 76 and lever member 15 is so adjusted by the adjustment member 155 that the contact members 93, 95 are not moved into closed circuit position until lever member 15 has engaged and picked up lever member 16, while in the reverse movement the contact members 93, 95 are not moved to open circuit position until the lever member 15 has left the lever member 16. It can easily be seen that the force exerted by the spring 59 will determine the differential in pressure between that necessary to move the contact members 93, 95 to closed circuit position and that necessary to move the contact members 93, 95 to open circuit position.

As was set forth hereinbefore, under normal conditions of operation the snap spring 84 will not be flexed upon movement of the plunger member 76 because of the relatively greater width of the restricted portion of the aperture 82 with respect to that of the aperture 81. However, should the fluid pressure within chamber 32ª increase substantially beyond that necessary to rotate the lever members 15, 16 to cause snap spring 83 to bow outwardly toward the cover member 71, or into switch closed position, then the snap spring 84 will be engaged by the wall of aperture 82 and flexed into a bowed position similar to that of spring 83, closing the contact members 94, 96 and thereby energizing the alarm to attract attention to the abnormal condition.

The high pressure power element 7 comprises a hollow casing member 200 which preferably has an upper end wall 201 and a flanged, open lower end 202 secured to the outside of the wall 4 by means of screws. Located within the casing 200 is a pair of plate-like lever members 203, 204 having downwardly projecting fingers 203ª, 204ª respectively extending through the open end of the casing 200 and through an aperture 205 in the wall 4 into the casing 2 so that one finger is located on either side of the blade 153 adjacent the plunger member 76. The lever members 203, 204 are pivoted on pins 206, 207 respectively which have their opposite ends secured in apertures in the walls of the casing 200. Carried within an aperture 208 in the end wall 201 and overlying the lever member 203 is a pressure responsive element, generally designated 209. The element 209 comprises a tubular member 210 having an end wall 211 in which is a restricted orifice 212. The lower end of the tubular member 210 receives, in fluid-tight relation, the upturned flange 213 of an annular member 215. A bellows 216 has one end sealed to the annular members 215 and has its other end extending upward into the tubular member 210. The upwardly extending end of the bellows 216 is sealed to a plate-like member 217. The wall 211, members 210, 215 and 217, and bellows 216 cooperate to form a sealed, expansible-contractible, pressure responsive chamber 217ª communicating through the orifice 212 with a conduit member 217ᵇ which may be connected to a refrigerating system high side, such as at the outlet of the compressor, so that high side refrigerant pressure is communicated to the chamber 217ª. Secured within a central aperture of the plate-like member 217 is one end of a thrust member 218 which has its other end extending downward through the bellows 216 to engage a second thrust member 219 having engagement with the lever member 204. The thrust member 219 is slidably received and carried within a tubular member 220 rigidly secured to the lever member 203. The tubular member 220 has at its lower end a wall 221 which has an aperture substantially fitting the thrust member 219 and guiding it in its reciprocal movement. The thrust member 219 is urged against an upper shoulder 222 of the tubular member 220 by a helical coil spring 223 interposed between the wall 221 and a shoulder 223ª of the member 219. The lever members 203, 204 are limited in their counterclockwise and clockwise rotational movement respectively by a stop member 224 which may be a pin or shaft extending through aligned apertures in the casing 200.

The lever member 204 is urged in a clockwise direction against the stop member 224 and the thrust member 219 by a helical coil spring 230 held under tension by means of an adjustment screw 231 extending through an aperture in the top wall 201 and received by a screw-threaded nut 233 to which the spring 230 is securely fastened. The other end of the spring 230 is anchored to an upturned flange on the lever 204. The lever member 203 is urged in a clockwise direction away from the stop member 224 by a helical coil spring 234, the tension of which is controlled by means of an adjustment screw 235 extending through an aperture in the top casing wall 201 and a nut 236 secured in the upper end of the spring 234 so that the thrust members 218, 219 are continually in engagement. The other or lower end of the spring 234 is anchored to a forward extending flange on the lever 203. The spring 223 must exert a greater force than the maximum force exerted by the spring 234 so that rotation of the lever member 203 is directly responsive to and in accordance with the position of thrust member 218 prior to engagement of lever member 203 and stop member 224. Upon a predetermined low pressure in the chamber 217ª, the spring 234 will rotate the lever member 203 so that the finger 203ª will engage and flex the blade 153 relative to lever member 15 to move the plunger member 76 to close the contact members 93, 95 of switch means 75. Upon a predetermined increase in pressure in the chamber 217ª to the low limit of normal operating pressure, the thrust member 218 will rotate the lever member 203 against the stop member 224, with the finger 203ª out of opposing engagement with the blade 153, so that the plunger member 76 is again operable by and in accordance with the fluid pressure in chamber 32ª. Upon a predetermined maximum high pressure in chamber 217ª the thrust member 218 is urged downward, moving the thrust member 219 downward within the tubular member 220 of the lever member 203 which is held against rotation by engagement with the stop member 224. The downward movement of the thrust members 218, 219 acts to rotate lever member 204 in a counterclockwise direction so that the finger 204ª engages blade 153 to maintain the plunger member 76 in a position to hold the switch means 74, 75 in open circuit position irrespective of the pressure in chamber 32ª. If the switch means 74 is in closed circuit position, due to the pressure in chamber 32ª when the maximum high pressure occurs in chamber 217ª, then the finger 204ª will engage and move the blade 153 toward the right, carrying with it the plunger member 76 and opening the switch means 74. Upon a predetermined decrease in fluid pressure within the chamber 217ª the spring 230 will rotate the lever member 204 so that the finger 204ª is spaced from the blade 153 and the switch means 74, 75 are again operable by and in response to fluid pressure within chamber 32ª. It will thus be seen that the spring 223 acts to maintain the thrust member 219 rigid with the lever member 203 during low pressure operation of the power element 209 and allows relative movement during high pressure operation of the power element 209.

The nuts 233 and 236 carry indicator pointers 238, 237 respectively, which cooperate with suitable indicia plates 239, 240 to indicate the pressures at which the lever members 203, 204 are rotated to engage the blade 153 and move it to operate the switch means 74. The adjustment screws 231, 235 have longitudinal slots 242 in their heads which are located external of the wall 201 for reception of a suitable tool, such as a screw driver, so that the tension of springs 230, 234 may be easily adjusted. After adjustment, the heads of the screws 231, 235 are concealed by caps or locking members 243, 244, held in position by screws 245, 246, to prevent careless tampering with the adjustment screws 231, 235.

In Figs. 12, 13 and 14 I have shown a somewhat modified form of my invention. The helical coil compression spring 59 has been replaced by a tension spring 300 having one end 301 secured to a combination thrust and stop member 302 rigidly secured to the lever member 16. The member 302 has a flange or head portion 303 extending below and spaced from the lever member 16 and engageable by the lever member 15 upon clockwise movement thereof. The upper end 304 of the helical coil tension spring 300 is rigidly secured to a nut-like member 305 threaded to a bolt-like adjusting screw 306. The adjusting screw 306 extends upward through an aperture in the wall 4 and has a flange or collar portion 307 abutting the top surface of the wall 4 and acting to prevent downward movement of the adjusting screw 306 due to the force of the spring 300. The screw 306 carries, intermediate the wall 4 and the member 305, a knurled nut-like member 307a held rigid with the screw 306 by a set screw. The serrated or knurled edge of member 307a cooperates with the spring locking member 60 to prevent unwanted movement of screw 306, similarly to the cooperation of the member 60 and nut 53. A knurled handle member 308 is suitably secured to the adjusting screw 306 above the collar 307 by a set screw 309 so that the adjusting screw 306 may be easily rotated manually externally of the casing. The handle member 308 preferably carries a pointer member 310 which cooperates with a suitable indicia plate 311 rigid with the casing wall 4 to indicate the setting of the adjustment screw 306. The member 310 also cooperates with a stop or post 311a to limit rotation of the screw 306 to less than 360°. A reenforcing post member 311b has one end secured to the wall 4 and its other end secured to the wall 5, and prevents relative movement therebetween. An indicia plate 311c may be secured to the post member 311b in a suitable manner, such as by screws, and cooperates with an index finger movable by the adjusting nut 52 to indicate the setting of the spring 54. Rotational movement of the lever member 16 in a counterclockwise direction, due to the force of the spring 300, is limited by engagement of the lever member 16 with a flange portion 312 of a stop member 313 secured to the wall 5. The stop member 313 has a second flange 314 which cooperates with lever member 15 to limit movement thereof in a clockwise direction under influence of the coil spring 54. In this form of apparatus, the blade 153 is adjusted so that the plunger member 76 does not move the snap spring 83 through center to close switch means 74 until the force of differential spring 300 is absorbed by the stop member flange portion 312 so that the pressure in the power element 6 to close the switch means 74 is determined solely by the range spring 54. The position of blade 153 is such that on the return movement of plunger member 76 to open the switch means 74, by decreasing pressure in element 6, the snap spring 83 is not moved through center until the opposing force exerted by the differential spring 300 is picked up by the lever member 15 by its engagement with the head portion 303 of lever member 16.

It may be seen that in the apparatus shown in Fig. 1, engagement and synchronous movement of the lever members 15, 16 occurs upon increase in fluid pressure within the chamber 32a. In the modification as shown in Figs. 12, 13 and 14, the engagement of and synchronous movement of the lever members 15, 16 occurs upon reduction of the fluid pressure in chamber 32a. In this manner I have provided, in the construction of Figs. 12, 13 and 14, a means for varying the differential in pressure between that necessary to move the switch means 74 to closed circuit position and that necessary to open the switch means 74 without changing the adjustment or force required for moving the switch means 74 into closed circuit position. The apparatus as shown in Fig. 1 maintains a constant switch opening pressure irrespective of change in the force exerted by the differential spring 59 for varying switch closing pressures of the switch means 74. In the apparatus shown in Fig. 1, and the modification shown in Fig. 12, adjustment of the force exerted by the range spring 54 changes both the cut-in and cut-out pressures requisite in the chamber 32a to cause the switch means 74 to move to open and closed positions without however changing the pressure differential.

My apparatus is particularly adapted for use on a refrigerating system in which the pressure within the chamber 32a is either sensitive directly to the fluid pressure within the evaporator of the system, or the temperature of the evaporator as reflected in a sealed system containing an amount of temperature sensitive, volatile fluid and connected to the power element 6. The chamber 211a is adapted to be responsive directly to the fluid pressure in the condenser side of the refrigerating system, or to be responsive to the temperature thereof as reflected by the pressure in a sealed system containing an amount of temperature sensitive, volatile fluid and connected to the power element 7. Under normal operation of the refrigerating system the adjustment of the springs 230, 234 is such that the lever members 203, 204 are held against the stop member 224 and the operation of the switch means 74, 75 is directly controlled by the pressure within chamber 32a. Upon a predetermined high pressure in the chamber 32a the thrust member 29 will have rotated the lever members 15, 16 to move the plunger member 76 to the left, facing Fig. 4, so that the contact members 93, 95, which control the circuit to the compressor motor, will be in closed circuit position. Should the fluid pressure within chamber 32a increase substantially above the predetermined high pressure, the plunger member 76 will have been moved still further to the left, facing Fig. 4, so that the contact members 94, 96 will be in closed circuit position and energize an alarm circuit to call the operator's attention to the increased temperature of the refrigerating system evaporator. Normally however the pressure and temperature of the evaporator does not exceed the predetermined high pressure at which the contacts 93, 95 move to closed circuit position. Upon a predetermined low pressure in the chamber 32a, which reflects a corresponding low temperature and pressure in the evaporator, the lever members 15, 16 will be rotated by their respective springs 54, 59 so that the plunger member 76 will have opened the contact members 93, 95 to stop operation of the refrigerating compressor. Should it be desired to increase the differential of pressure and temperature maintained in the refrigerating evaporator, it is only necessary to adjust the adjusting nut 53 so that the force of the spring 59, acting to rotate the lever member 16 in a clockwise direction, is increased. However, it will be noted that this increase in differential is accomplished by adjusting the pressure at which the contact members 93, 95 are moved to closed circuit position. As was set forth hereinbefore, the contact members 93, 95 are moved to closed circuit position subsequent to engagement of the lever members 15, 16 so that rotation thereof is opposed by the sum of the forces of springs 54, 59, while the contact members 93, 95 are moved to open circuit position solely under the influence of the spring 54.

The modification shown in Figs. 12, 13 and 14 cooperates in substantially the same manner in controlling the refrigerating system except that instead of the differential adjusting spring 300 controlling the point at which the contact members 93, 95 are moved to closed circuit position, it adjusts the point at which the contact members are moved to open circuit position, or the low temperature limit of the evaporator. It will be seen that upon a predetermined high pressure in the chamber 32ª the lever member 15 will have been rotated by the thrust member 29 away from the head portion 303 so that the spring 54 is the sole spring acting in opposition to the thrust of the thrust member 29. Upon a predetermined lower fluid pressure in the chamber 32ª the lever member 15 will have rotated sufficiently in a clockwise direction under the influence of spring 54 so that the lever member is in engagement with the head portion 303 and springs 300 and 54 cooperate together to determine the opposing force exerted upon the thrust rod 29. The modification shown in Figs. 12, 13 and 14 is particularly adapted to refrigerating systems, such as meat storage refrigerators, in which it is desired to insure positive defrosting of the refrigerating coils or evaporators each cycle of operation, and yet having a simple and easy means for adjusting the average temperature maintained in the refrigerator.

The power element 209 does not act with a snap but acts with a modulating action to move the plunger member 76 to open or closed position. At pressures approaching the predetermined low pressure or predetermined high pressure of the power element 209, the blade 153 has sufficient rigidity to enable the power element 6 to move the finger 203ª or finger 204ª against the force of the power element 209. In the event that the pressure within power element 209 decreases to a pressure which is somewhat greater than the predetermined pressure at which the finger 203ª acts to urge the plunger member 76 to closed circuit position, but less than the pressure necessary to maintain the lever member 203 against the stop 224, the finger 203ª will be urged into a position slightly to the left, facing Fig. 4, of that shown. In such a position the finger 203ª acting through the power element 209 will be moved by and opposed movement of the blade 153 during clockwise movement of the blade 153 and the power element 209 will thereby act to reduce the pressure of element 6 necessary to open the switch means 74 and/or 75, but such a position of the finger 203ª and power element 209 will not affect the pressure of element 6 necessary to close the switch means 74 and/or 75. In the event that the element 209 is acting to urge the finger 203ª into this said position, the power element 209 will act to increase the pressure differential of the element 6 so that the refrigerating system, which may be controlled by the apparatus shown and described, will be made to operate with a lower average cooling unit temperature. Such operation may be beneficial and desirable under certain operating conditions. In a similar manner, the finger 204ª will act to increase the operating pressure differential of the element 6 at fluid pressures of the element 209 slightly lower than the predetermined pressure at which the power element 209 acts to open the switch means 74, 75 irrespective of fluid pressure within the power element 6. In this event however it is the pressure of the power element 6 necessary to move the switch means 74 and/or 75 to closed circuit position which is varied, rather than that necessary to move the switch means to open circuit position.

It will now be seen that I have invented an apparatus which is operable to control a plurality of electrical circuits in response to a fluid pressure, and the electrical circuits are also operable to be controlled by a second normally inactive power element upon occurrence of predetermined, abnormal conditions. It may also be seen that I have invented a simple and easily installed and serviced apparatus in which the various parts thereof are easily removed for repair or replacement of parts, without unnecessary alteration to the unaffected parts of the apparatus.

What I claim and desire to secure by Letters Patent of the United States is:

1. A control device comprising switch means, an overcenter member for actuating said switch means, a plunger operable to move said member overcenter, a lever, an arm on said lever and operable to move said plunger, a power element operable to move said lever thereby to cause said arm to move said plunger, means opposing movement of said lever by said element, a second lever concentrically fulcrumed with and movable by said first-named lever, means opposing movement of said second lever by said first-named lever, said arm being movable relative to said first named lever, and means to move said arm to operate said plunger irrespective of the movement of said levers.

2. A control device comprising switch means, an overcenter member for actuating said switch means, a plunger operable to move said member overcenter, a lever, an arm on said lever and operable to move said plunger, a power element operable to move said lever, means opposing movement of said lever by said element, a second lever concentrically fulcrumed with and movable by said first-named lever, means opposing movement of said second lever by said first-named lever, said arm being movable relative to said first-named lever, a lever engageable with said arm, and automatic means operable through said last-named lever to move said arm to operate said plunger.

3. A control device comprising switch means, an overcenter member for actuating said switch means, a plunger operable to move said member overcenter, a supporting shaft, a lever journaled on said shaft and operable to move said plunger, a force transmitting member carried by said lever, a power element engaging said force member and operable to move said lever, means engageable with said force member and operable to oppose movement of said lever by said element, a second lever concentrically fulcrumed with and movable by said first-named lever and journaled on said shaft, said second lever being positioned intermediate said first-named lever and said engageable means and having an aperture through which said force member extends, and means opposing movement of said second lever by said first-named lever.

4. A control device comprising switch means, an overcenter member for actuating said switch means, a plunger operable to move said member overcenter, a lever having a flange, a flexible blade fixed to said flange and operable to move said plunger, means to adjust said blade relative to said flange, a power element operable to move said lever, means opposing movement of said lever by said element, a second lever concentrically fulcrumed with said first-named lever and movable by said first-named lever, and means opposing movement of said second lever by said first-named lever.

5. A control device comprising switch means, an overcenter member for actuating said switch means, a lever operable to move said member overcenter, an abutment carried by said lever and extending from one face thereof, a power element operable to move said lever, a coil spring opposing movement of said lever by said element and engageable with said abutment, a second lever concentrically fulcrumed with and movable by said first-named lever and having an aperture through which said abutment extends, a second coil spring positioned adjacent and parallel to said first-named spring and opposing movement of said second lever by said first-named lever, means to limit movement of said second lever by said second spring prior to movement of said overcenter member overcenter in one direction, said second lever being moved by said first-named lever prior to movement of said overcenter member overcenter in another direction, means to adjust the forces of said springs, and a unitary locking means for holding said adjusting means in position.

6. A control device comprising a casing having top and bottom walls and a rear wall, a bracket member secured to said bottom wall, a shaft supported by said bracket member and extending parallel to said bottom wall and normal to said rear wall, a lever journaled on said shaft, an abutment member extending upward from said lever, a second lever journaled on said shaft and overlying said first-named lever, said second-named lever having an aperture therethrough through which said abutment member extends, an adjustable abutment member carried by said top wall, a coil spring under compression and positioned between said abutment members, a stop member secured to said second-named lever and having a flange engageable by said first-named lever, an adjustable supporting member carried by said top wall, a coil spring under tension and secured to said supporting member and to said stop member, a U-shaped locking member secured to said rear wall and engageable with said adjustable abutment member and with said supporting member to hold said members in adjusted position, an upstanding arm on said first-named lever and having a flange normal to said rear wall, a flexible blade secured to and extending upward beyond said flange, an adjustment screw for regulating the position of said blade and carried by said flange, a switch housing mounted on said rear wall, overcenter switch means in said housing, a plunger reciprocal through the wall of said housing and operable to actuate said switch means, said plunger extending parallel to said rear wall and having a converging-diverting slot in its rear face receiving said blade, and means to close the aperture in said housing around said plunger.

7. In an apparatus of the character described for controlling a controlled means, a controlling means having two positions of operation for controlling the controlled means, power means sensitive to a condition of the controlled means and operable to move said controlling means to either of said positions, and a second power means normally disengaged from said controlling means and sensitive to a second condition of the controlled means and operable to move said controlling means to either of said positions irrespective of said first-named power means, said controlling means having a third position, said first-named power means being operable to move said controlling means to said third position upon a predetermined abnormal condition of the controlled means.

8. In an apparatus of the character described for controlling a controlled means, a controlling means having two positions of operation for controlling the controlled means, power means sensitive to a condition of the controlled means and operable to move said controlling means to either of said positions, a second power means normally disengaged from said controlling means and sensitive to a second condition of the controlled means and operable to move said controlling means to either of said positions irrespective of said first-named power means, said controlling means having a third position, said first-named power means being operable to move said controlling means to said third position upon a predetermined abnormal condition of the controlled means, and means sensitive to a third condition of the controlled means and operable to render said first-named power means ineffective.

9. In an apparatus of the character described, a power element, a pair of spring-urged lever members operable to be moved by said power element, stop means for limiting rotational movement of said members, means connecting said members and said element so that said element is operable to move one of said members into engagement with said stop means and then to move the other of said members out of engagement with said stop means.

10. In an apparatus of the character described, a casing, a pair of overlying pivoted levers carried by said casing, one of said levers having a shoulder, thrust means, means urging said thrust means into engagement with said shoulder, a stop member interposed intermediate said levers to limit rotation thereof, resilient means urging the other of said levers against said stop member, resilient means urging said one lever away from said stop member, and power means engaging said thrust means and operable to rotate said one lever against the force of said second-named resilient means into engagement with said stop member, said power means being operable upon engagement of said one lever and said stop member to move said other lever against the force of said first-named resilient means out of engagement with said stop member.

11. In an apparatus of the character described, a casing, a pair of overlying pivoted levers carried by said casing, one of said levers having a shoulder, thrust means, means urging said thrust means into engagement with said shoulder, a stop member interposed intermediate said levers to limit rotation thereof, resilient means urging the other of said levers against said stop member, resilient means urging said one lever away from said stop member, power means engaging said thrust means and operable to rotate said one lever against the force of said second-named resilient means into engagement with said stop member, said power means being operable upon engagement of said one lever and said stop member to move said other lever against the force of said first-named resilient means out of engagement with said stop member, and means for adjusting the force required by said power means to rotate said levers.

12. In an apparatus of the character described, an overcenter means movable into two positions of operation, a pressure sensitive element, lever means operatively connecting said element and said means, means acting on said lever means and operable to oppose movement of said overcenter means by said element to the first of said positions, said element being operable upon a predetermined pressure to overcome said acting means and to move said overcenter means to said first position, said acting means being operable to move said overcenter means to the second of said positions upon a second pressure in said element, a second pressure sensitive element, means operatively connecting said second element and said overcenter means, said second element acting through said connecting means to oppose movement of said overcenter means to said second position thereby to modulate and vary the second pressure at which said acting means acts to overcome said first-named element to move said overcenter means to said second position.

13. In an apparatus of the character described, an overcenter means movable into two positions of operation, a pressure sensitive element, lever means connecting said element and said means, resilient means acting on said lever means and operable to oppose movement of said overcenter means by said element to the first of said positions, said element being operable upon a predetermined pressure to overcome said resilient means and to move said overcenter means to said first position, said resilient means being operable to move said overcenter means to the second of said positions upon a second pressure in said element, a second pressure sensitive element, lever means connecting said second element and said first-named lever means, said second element acting through said connecting means to oppose movement of said overcenter means to said second position thereby to modulate and vary the second pressure at which said resilient means acts to overcome said first-named element to move said overcenter means to said second position.

14. In an apparatus of the character described, a pressure sensitive power element, an overcenter electric switch means having open and closed positions, means operatively connecting said switch means and said element and having two positions, said element being operable upon a predetermined fluid pressure to move said connecting means to one of said positions, said connecting means being operable upon movement to said one position to move said switch means to said closed position, means urging said connecting means toward another of said positions against the force of said element, said urging means being operable upon a reduction of fluid pressure in said element to move said connecting means to said another position, said connecting means being operable upon movement to said another position to move said switch means to said open position, and pressure sensitive means cooperable with said connecting means and operable to oppose said urging means thereby to modulate the pressure of said element at which said switch means will be moved to said open position by said urging means.

15. In an apparatus of the character described, a pair of lever members having overlying portions, a power element having an operating part overlying said portions, resilient means urging one of said members in one direction, resilient means urging the other of said members in said one direction, stop means limiting movement of said one member in said one direction and limiting movement of said other member in a direction opposite to said one direction, thrust means engaging said one member portion and carried by said other member portion and engaged by said operating part, resilient means urging said thrust means in a direction toward said operating part, and stop means limiting movement of said thrust means by said last-named resilient means.

16. In an apparatus of the character described, a pair of lever members having overlying portions, a power element having an operating part overlying said portions, resilient means urging one of said members in one direction, resilient means urging the other of said members in said one direction, stop means limiting movement of said one member in said one direction and limiting movement of said other member in a direction opposite to said one direction, thrust means engaging said one member portion and carried by said other member portion and engaged by said operating part, resilient means urging said thrust means in a direction toward said operating part, and stop means limiting movement of said thrust means by said last-named resilient means, said last-named resilient means exerting a greater force than the maximum force exerted by said second-named resilient means.

17. A control device comprising control means, an overcenter member for actuating said control means, a lever member for moving said overcenter member, a power element operable to move said lever member, means opposing movement of said lever by said element, a second lever, means opposing movement of said second lever, said first-named lever being operable to move said second lever against the force of said last-named opposing means prior to movement of said overcenter member overcenter in one direction, and stop means limiting movement of said second lever by said last-named opposing means prior to movement of said overcenter means overcenter in a second direction.

18. In an apparatus of the character described, a casing having a wall with an aperture therethrough, a pair of overlying leaf springs carried by said casing, each of said springs having two bowed positions within said casing, a pair of overlying flexible blade members, one of said blade members having one end rigidly secured to said casing and having its other end operatively carried by one of said springs, the other of said blade members having one end rigidly secured to said casing adjacent said one blade member and having its other end operatively carried by the other of said springs, a pair of contact members carried by said casing, a contact member secured to and carried by each of said blade members and cooperable with said first-named contact members to control a pair of electric circuits, a plunger member carried by said casing in said aperture, said plunger member being operable upon movement to move each of said springs to each of their said two positions, lost motion means connecting said plunger member to each of said blade members, said lost motion means having greater lost motion relative to one of said blade members than it has relative to the other of said blade members so that said plunger member will move the blade member connected with the smaller lost motion prior to movement of the blade member connected with the greater lost motion.

19. In an apparatus of the character described, a casing, a flexible blade secured at one end to said casing and having its other end portion twisted into the plane of movement of said blade, said other end portion having an end slot, a leaf spring carried by said casing and having a bowed position, said spring having its edge portion extending into said slot and lying substantially in the plane of said blade, control means carried by said blade, and an operating member extending transverse to said spring, said operating member having a plate-like portion with an edge slot receiving said spring such that said operating member can move said spring from said bowed position.

20. In an apparatus of the character described, a wall member having an aperture therethrough, a U-shaped member carried by said wall member and having a pair of opposed slots, a bowed leaf spring carried by said U-shaped member with its end portions within said slots, said spring being positioned adjacent said aperture and having two positions of rest, a plunger member slidable within said aperture and operable to move said bowed spring to each of said positions, said plunger member having a hook portion, said bowed spring being carried in said hook portion, a blade member extending substantially normal to the plane of movement of said bowed spring and extending substantially parallel to said wall member, said blade member having one end portion carried by said wall member and having its other end portion operatively connected to said bowed spring, and a control means movable by said blade member upon movement of said bowed spring over center.

21. In an apparatus of the character described, a supporting member, a lever member fulcrumed on said member, a power element secured to said supporting member and operable to move said lever member, an opposing means operable to oppose movement of said lever member by said power element, a switch means carried by said supporting member and having a reciprocal thrust member movable between predetermined limits, and a semi-rigid blade member movable by said lever member and operable upon movement to move said thrust member, said blade member having a rigidity such that substantially no flexing occurs prior to movement of said thrust member to one of said predetermined limits and having such flexibility that subsequent to movement of said thrust member to said one predetermined limit said blade member will flex thereby to allow continued movement of said lever member.

22. In an apparatus of the character described, a supporting member, a lever member fulcrumed on said member, an arm member carried by and extending outwardly from said lever member, a power element secured to said supporting member and operable to move said lever member, an opposing means operable to oppose movement of said lever member by said power element, a switch means carried by said supporting member, a semi-rigid blade member carried by said arm member and having its free end urged toward said arm member due to the innate resiliency of said blade member, said blade member being movable with said lever member and operable upon movement to operate said switch means, said blade member having a rigidity such that substantially no flexing occurs upon operation of said switch means by said lever member, and means carried by said arm member and engaging said blade member for flexing said blade member against its innate resiliency and away from said arm member thereby to adjust the position at which said lever member actuates said switch means.

23. In a control device, a housing, a shaft in said housing, a bell crank lever supported by said shaft, a power element carried by said housing and acting on one arm of said lever, a spring in said housing and opposing movement of said lever by said power element, the other arm of said lever extending longitudinally of said spring, an operating blade secured at one end to said other arm and extending therebeyond, an abutment member on said other arm holding said blade under stress and determining the position of said blade relative to said other arm, a control means, and a plunger extending transverse to said blade and operatively connecting the extending portion of said blade to said control means.

24. In a control device, a housing, a shaft in said housing, a bell crank lever supported by said shaft, a power element carried by said housing and acting on one arm of said lever, a spring in said housing and opposing movement of said lever by said power element, the other arm of said lever extending longitudinally of said spring, an operating blade secured at one end to said other arm and extending therebeyond, an abutment member on said other arm holding said blade under stress and determining the position of said blade relative to said other arm, a control means, a plunger having a slot receiving the extending portion of said blade, and means operatively connecting said plunger to said control means.

25. A control device comprising a casing having top and bottom walls and a rear wall, a bracket member secured to said bottom wall, a shaft supported by said bracket member and extending parallel to said bottom wall and normal to said rear wall, a lever journaled on said shaft, an abutment member extending upward from said lever, a second lever journaled on said shaft and overlying said first-named lever, said second-named lever having an aperture therethrough through which said abutment member extends, an adjustable abutment member carried by said top wall, a coil spring under compression and positioned between said abutment members, a stop member secured to said second-named lever and having a portion engageable by said first-named lever, an adjustable supporting member carried by said top wall, a coil spring under stress and cooperable with said supporting member and with said second lever, a U-shaped locking member secured to said rear wall and engageable with said adjustable abutment member and with said supporting member to hold said members in adjusted position, an upstanding arm on said first-named lever and having a flange normal to said rear wall, a flexible blade secured to and extending upward beyond said flange, means for positioning said blade relative to said flange, a switch housing mounted on said rear wall, overcenter switch means in said housing, a plunger reciprocal through the wall of said housing and operable to actuate said switch means, said plunger extending parallel to said rear wall and having an aperture receiving said blade, and means to close the aperture in said housing around said plunger.

26. A control device comprising a casing having top and bottom walls and a rear wall, a bracket member secured to said bottom wall, a shaft supported by said bracket member and extending parallel to said bottom wall and normal to said rear wall, a lever journaled on said shaft, an abutment member extending upward from said lever, a second lever journaled on said shaft and overlying said first-named lever, said second-named lever having an aperture therethrough through which said abutment member extends, an adjustable abutment member carried by said top wall, a coil spring under compression and positioned between said abutment members, a stop member secured to said second-named lever and having a portion engageable by said first-named lever, an adjustable supporting member carried by said top wall, a coil spring under stress and cooperable with said supporting member and with said second lever, an upstanding arm on said first-named lever and having a flange normal to said rear wall, a flexible blade secured to and extending upward beyond said flange, means for positioning said blade relative to said flange, a switch housing mounted on said rear wall, overcenter switch means in said housing, and a plunger reciprocal through the wall of said housing and operable to actuate said switch means, said plunger extending parallel to said rear wall and having an aperture receiving said blade.

27. A power element comprising a housing member, a pressure sensitive chamber carried by said member and having a movable wall, means under stress and operatively opposing movement of said wall in one direction, a first lever member fulcrumed on said housing member and positioning one portion of said stressed means against movement in said one direction, means positioning said lever member against movement in said one direction, a second lever member fulcrumed on said housing member, a thrust means operatively connecting said wall and said second lever member and operable upon movement of said wall in said one direction to rotate said second lever member, and means operatively connected to said second lever member and operated upon rotation of said second lever member.

28. A power element comprising a housing member, a pressure sensitive chamber carried by said member and having a movable wall, means under stress and operatively opposing movement of said wall in one direction, a first lever member fulcrumed on said housing member and positioning one portion of said stressed means against movement in said one direction, means positioning said lever member against movement in said one direction, a second lever member fulcrumed on said housing member and having a portion underlying said first lever member, said first lever member having an aperture therethrough overlying said second lever member, thrust means operatively connecting said wall and said second lever member and extending through said aperture, said thrust means being operable upon movement of said wall in said one direction to rotate said second lever member, means under stress intermediate said housing member and said second lever member and being operable to oppose rotation of said second lever member by said thrust means, and means engageable by said second lever member and operable to be moved by and upon rotation of said second lever member.

29. A control device comprising a U-shaped casing with open end portions and having top and bottom walls and having a connecting rear wall, a post member connecting said top wall and said bottom wall adjacent the edge portion away from said rear wall and coacting with said rear wall to hold said top wall and said bottom wall in fixed space relation, a bracket member having spaced upturned flanges and secured to the top surface of said bottom wall, a shaft having its end portions secured in aligned apertures extending through said flanges and extending substantially parallel to said bottom wall and extending substantially normal to said rear wall, a plate-like lever member having substantially perpendicularly extending flange portions, said lever member flange portions having aligned apertures for receiving said shaft thereby to position said lever member for rotational movement, said bottom wall having an aperture therethrough underlying said lever member, a pressure sensitive power element having a thrust member and positioned against the lower surface of said bottom wall, said thrust member extending through said bottom wall aperture and being operable to engage and being operable to move said lever member upon change in pressure within said element, one of said lever member flanges having an upwardly extending portion providing a blade carrying portion, a semi-rigid blade member having one end portion thereof rigidly secured to said blade carrying portion and having its other end portion extending upwardly toward said top wall and extending beyond said blade carrying portion, a switch structure operable to control an electric circuit and secured to the inner surface of said rear wall between said top and bottom walls and having a reciprocal actuating member extending substantially parallel to said casing walls, means operatively connecting said blade member at said blade member other end portion for actuation of said switch upon said rotational movement of said lever member, said blade member having sufficient rigidity to reciprocate said reciprocal actuating member with substantially no flexing but having sufficient flexibility to bend upon the application of a force greater than that required to reciprocate said reciprocal actuating member, means carried by said casing and engageable with said blade other end portion for flexing said blade member thereby to actuate said switch irrespective of the position of said lever member, a U-shaped cover member cooperable with said casing member to form an enclosed space containing said lever member and said switch, and a holding means securing said cover member to said post member.

30. A control device comprising a U-shaped casing with open end portions and having top and bottom walls and having a connecting rear wall, a post member connecting said top wall and said bottom wall adjacent the edge portion away from said rear wall and coacting with said rear wall to hold said top wall and said bottom wall in fixed space relation, a bracket member having spaced upturned flanges and secured to the top surface of said bottom wall, a shaft having its end portions secured in aligned apertures extending through said flanges and extending substantially parallel to said bottom wall and extending substantially normal to said rear wall, a plate-like lever member having substantially perpendicularly extending flange portions, said lever member flange portions having aligned apertures for receiving said shaft thereby to position said lever member for rotational movement, said bottom wall having an aperture therethrough underlying said lever member, a pressure sensitive power element having a thrust member and positioned against the lower surface of said bottom wall, said thrust member extending through said bottom wall aperture and being operable to engage and being operable to move said lever member upon change in pressure within said element, one of said lever member flanges having an upwardly extending portion providing a blade carrying portion, a semi-rigid blade member having one end portion thereof rigidly secured to said blade carrying portion and having its other end portion extending upwardly toward said top wall and beyond said blade carrying portion, a switch structure operable to control an electric circuit and secured to the inner surface of said rear wall between said top and bottom walls and having a reciprocal actuating member extending substantially parallel to said casing walls, means for positioning said blade member other end portion relative to said blade carrying portion thereby to determine the position of said lever member at which said circuit is controlled, means operatively connecting said blade member at said blade member other end portion for actuation of said switch upon said rotational movement of said lever member, said blade member having sufficient rigidity to reciprocate said reciprocal actuating member with substantially no flexing but having sufficient flexibility to bend upon the application of a force greater than that required to reciprocate said reciprocal actuating member, means carried by said casing and engageable with said blade other end portion for flexing said blade member thereby to actuate said switch irrespective of the position of said lever member, a U-shaped cover member cooperable with said casing member to form an enclosed space containing said lever member and said switch, and a thumb screw extending through an aperture in said cover member and screw-threadedly engaging said post member for securing said cover member to said casing.

31. In an apparatus of the character described for controlling a controlled means, a controlling means having two positions of operation for controlling the controlled means, power means sensitive to a condition of the controlled means and operable to move said controlling means to either of said positions, flexible means operable to transmit a force from and connecting said power means to said controlling means and having sufficient rigidity so that bodily movement thereof by said power means correspondingly transmits the movement of said power means to said controlling means, a second power means sensitive to a second condition of the controlled means, and means operable by said second power means and for transmitting a force through said flexible means to move said controlling means to either of said positions, said last-named means being operable to flex said flexible means in two directions against the force of said first-named power means thereby to move said controlling means irrespective of the force exerted by said first-named power means.

32. In an apparatus of the character described for controlling a controlled means, a controlling means having two positions of operation for controlling the controlled means, a first power means sensitive to a condition of the controlled means, force transmitting means movable by said power means, means carried by said transmitting means and interconnecting said transmitting means and said controlling means and normally operable upon bodily movement thereof by said transmitting means to move said controlling means to either of said controlling means positions and substantially in direct accordance with movement of said power means, a second power means sensitive to a second condition of the controlled means, and lost motion means operatively connecting said second power means to said interconnecting means for movement thereof relative to said transmitting means in either direction upon actuation by said second power means, said second power means acting through said connecting means to transmit its force through said interconnecting means thereby to move said controlling means to either of said controlling means positions irrespective of the position of said first power means.

EARNEST J. DILLMAN.

CERTIFICATE OF CORRECTION.

Patent No. 2,292,214. August 4, 1942.

EARNEST J. DILLMAN.

It is hereby certified that error appears in the printed specification of the above numbered patent requiring correction as follows: Page 7, second column, line 53, claim 2, strike out "concentrically fulcrumed with and"; and that the said Letters Patent should be read with this correction therein that the same may conform to the record of the case in the Patent Office.

Signed and sealed this 13th day of October, A. D. 1942.

(Seal)

Henry Van Arsdale,
Acting Commissioner of Patents.